United States Patent [19]

Yoshida

[11] Patent Number: 4,509,137

[45] Date of Patent: Apr. 2, 1985

[54] LANGUAGE TRANSLATOR WITH RANDOM GENERATION OF TEST WORDS DURING LEARNING MODE

[75] Inventor: Kunio Yoshida, Yamabe, Japan

[73] Assignee: Sharp Kabushiki Kaisha, Osaka, Japan

[21] Appl. No.: 176,294

[22] Filed: Aug. 8, 1980

[30] Foreign Application Priority Data

Aug. 17, 1979 [JP] Japan .............. 54-105157

[51] Int. Cl.³ .................. G06F 15/38; G06F 7/58; G06F 3/14
[52] U.S. Cl. ................... 364/900; 364/419; 434/157; 434/167
[58] Field of Search ... 364/200 MS File, 900 MS File, 364/419; 434/157, 167; 179/1 S M; 381/50-52

[56] References Cited

U.S. PATENT DOCUMENTS

| | | | |
|---|---|---|---|
| 4,012,848 | 3/1977 | Diament et al. | 434/307 |
| 4,051,606 | 10/1977 | Tozo | 400/70 |
| 4,158,236 | 6/1979 | Levy | 364/900 |
| 4,159,536 | 6/1979 | Kehoe et al. | 364/900 |
| 4,209,836 | 6/1980 | Wiggins, Jr. et al. | 364/718 |
| 4,218,760 | 8/1980 | Levy | 364/900 |
| 4,245,405 | 1/1981 | Lien et al. | 434/178 |
| 4,339,806 | 7/1982 | Yoshida | 364/900 |
| 4,366,551 | 12/1982 | Holtz | 364/900 |
| 4,367,537 | 1/1983 | Yoshida | 364/900 |
| 4,406,626 | 9/1983 | Anderson et al. | 434/169 |
| 4,411,628 | 10/1983 | Laughon et al. | 434/169 |
| 4,421,487 | 12/1983 | Laughon et al. | 434/169 |
| 4,467,446 | 8/1984 | Sakurai | 364/900 |
| 4,468,756 | 8/1984 | Chan | 364/900 |

Primary Examiner—James D. Thomas
Assistant Examiner—A. E. Williams, Jr.
Attorney, Agent, or Firm—Birch, Stewart, Kolasch & Birch

[57] ABSTRACT

An electronic language interpreter, for enabling that a specific word in a first language be entered to obtain an equivalent translated word in a second language includes a memory specifying circuit for specifying each memory of a plurality of first memories for storing words written in the first language and second memories for storing translated words written in the second language. One of the first memories and one of the second memories both specified by the memory specifying circuit generate pairs of words including one of the words and its corresponding one of the translated word, respectively. A mode selector may be provided for selectively placing the language interpreter in an interpreter mode or in a mode wherein it functions as an electronic language learning aid for enabling that the plurality of translated words be sequentially retrieved from one of the second memories selected by the memory specifying circuit. Words considered to be equivalent to the translated words may be entered by the operator so as to determine their equivalency and to check his knowledge of the translated words.

5 Claims, 2 Drawing Figures

FIG.2

LANGUAGE TRANSLATOR WITH RANDOM GENERATION OF TEST WORDS DURING LEARNING MODE

BACKGROUND OF THE INVENTION

The present invention relates in general to an electronic dictionary and language interpreter for providing efficient and rapid retrieval of any desired word or words stored therein, and more particularly to a word information storage and retrieval device for such a translator.

Recently, a new type of electronic device called an electronic dictionary and language interpreter has been available on the market. The electronic dictionary and language interpreter differs from conventional type electronic devices in that the former is of a unique structure which provides for efficient and rapid retrieval of word information stored in a memory. An example of an electronic dictionary and language interpreter was disclosed in Levy U.S. Pat. No. 4,158,236, June 12, 1979, "ELECTRONIC DICTONARY AND LANGUAGE INTERPRETER".

With respect to such portable electronic devices, there have been proposed various word storage and retrieval systems with an aim toward minimizing the required word storage capacity for storing a maximum amount of word information and toward shortening retrieval time therefor.

One type of storage system is disclosed in U.S. Pat. No. 4,367,537 entitled "IMPROVEMENT IN ADDRESS RETRIEVAL IN AN ELECTRONIC DICTIONARY AND LANGUAGE INTERPRETOR". The device disclosed in this patent stores a great number of words in memory in alphabetical order. The disclosure of this patent is incorporated herein by reference.

In another aspect, an electronic translator may function as a word learning apparatus wherein one or more words in the operator's native language are sequentially entered and retrieved from the memory and then shown in a display, and foreign or translated words corresponding to the native words are entered by the operator with the object to compare their equivalency and decide if he knows the meanings of the words. In such a case, it would be preferable that a great number of native words can be retrieved, particularly words of a common level of difficulty.

SUMMARY OF THE INVENTION

Accordingly, it is an object of the present invention to provide an improved retrieval system for an electronic translator.

It is a further object of the present invention to provide an improved retrieval system for retrieving only a certain group of words according to a classification covering the group.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a device is provided for enabling that a specific word in a first language be entered to obtain a translated word in a second language, equivalent to the specific word. The device comprises a memory specifying circuit for specifying each locations in a first memory for storing words in the first language and in a second memory for storing translated words in the second language. One location in each of the first and second memories both specified by the memory specifying circuit stores pairs of one of the words and its corresponding translated word, respectively. A mode selector may be provided for selectively placing the device in the interpreter mode or in a language learning mode for enabling that translated words be sequentially retrieved from the locations of the second memory selected by the memory specifying circuit, and for enabling entry of words considered to be equivalent to the translated words by the operator so as to determine their equivalency and check the operator's knowledge of such words.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIG. 2 shows exemplary forms of word contents in respective memories connected in the control circuit of FIG. 1.

DESCRIPTION OF THE INVENTION

Figure 1:
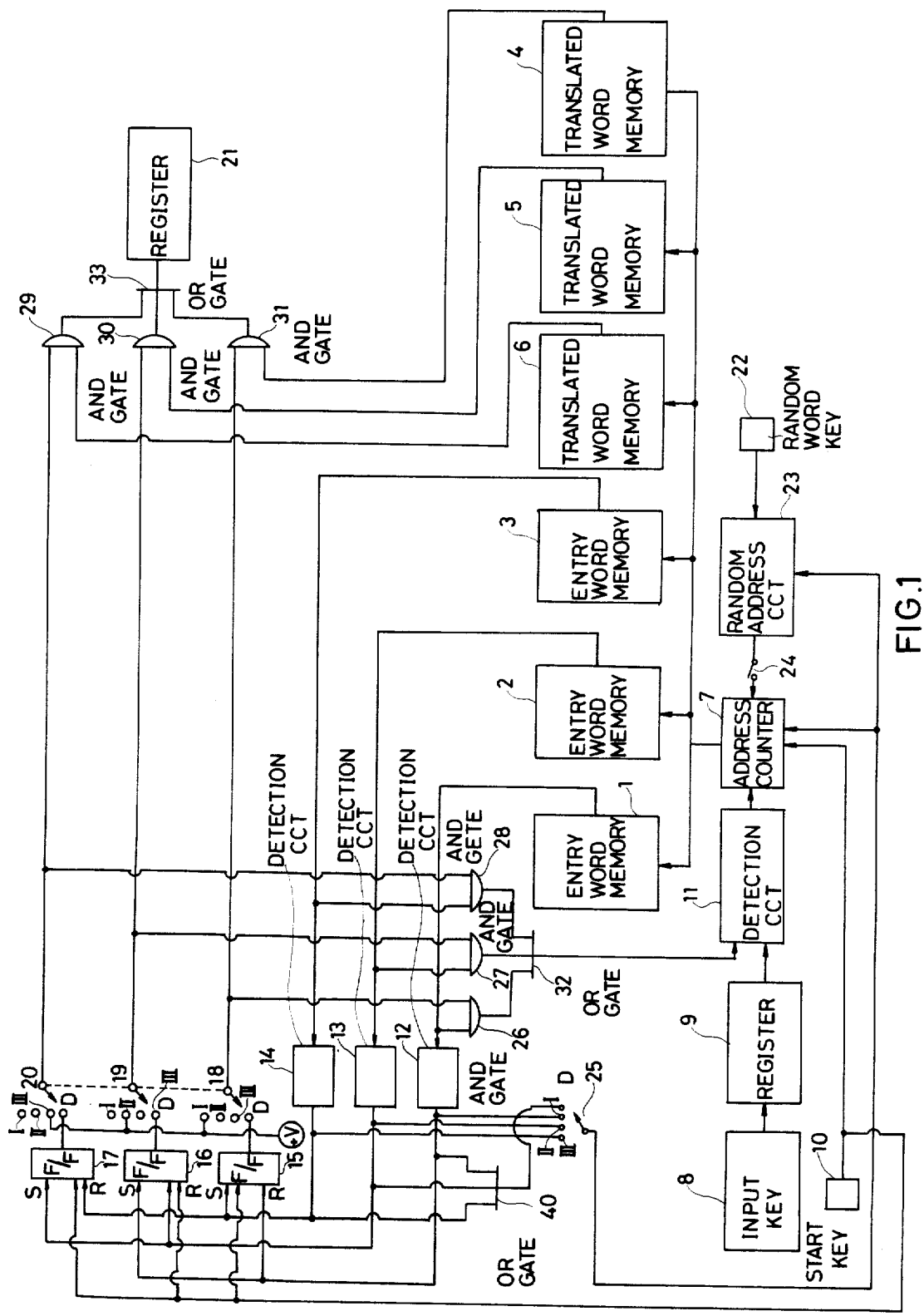
FIG. 1 is a block diagram of a control circuit incorporated into an electronic translator according to the present invention.

First of all, any languages can be applied to an electronic translator of the present invention. An input "source" word is input in a specific language to obtain an equivalent word, or a translated word corresponding thereto in a different language corresponding thereto. The kind of the languages can be freely selected. According to an example of the present invention, it is assumed that the "source" language is English and the translated language is Japanese.

Referring to FIG. 1, there is illustrated a control circuit incorporated into an electronic translator according to the present invention. A great number of English words as entry words are classified into three groups by rank or level of difficulty according to whether they are suitable for junior high school students, high school students, or college students, for example, in quantities of about 1,500, 4,500, and 4,000, respectively.

The control circuit of FIG. 1 comprises three entry memories 1, 2 and 3 each for storing a great number of entry words in English. They each comprise a read only memory (ROM). English words are arranged in a certain order, preferably, in an alphabetical order. The entry word memory 1 contains the words for the junior high school students in a quantity of about 1,500. Another memory 2 contains the words for the high school students in a quantity of about 4,500. Still another memory 3 stores the words for the college students in a number of about 4,000.

Three translated word memories 4, 5 and 6 are provided for containing a great number of Japanese translated words equivalent to the great number of English entry words of the entry word memories 1, 2 and 3, respectively. An address counter 7 is connected to all of the memories 1 through 6 for addressing words stored therein at the same time. Output signals developed from these memories 1 through 6 are paired in three pairs. A first combination is of the output signals from the memories 1 and 4, a second combination is of the output signals from the memories 2 and 5, and a third combination of the output signals from the memories 3 and 6.

Figure 2:
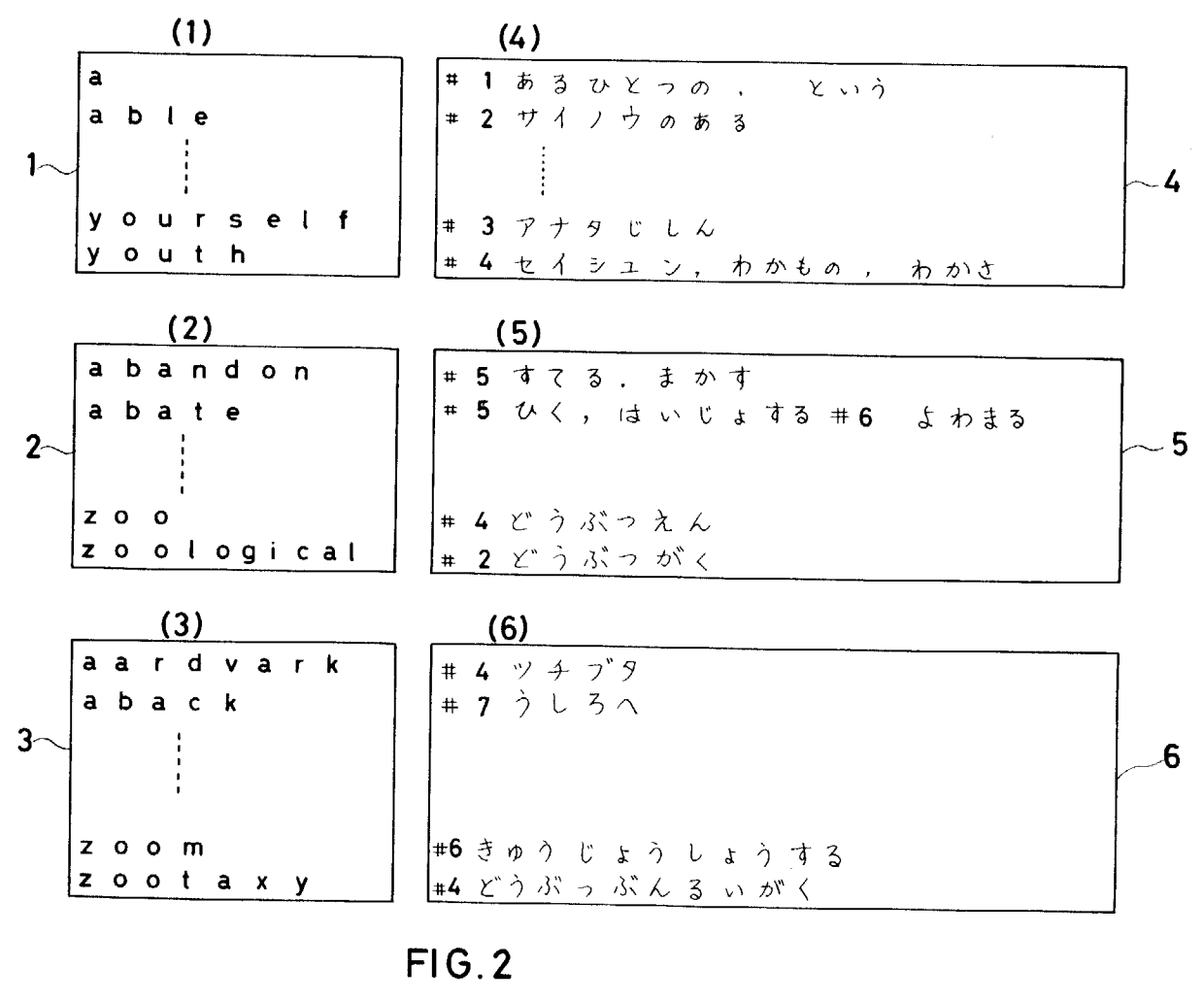

FIG. 2 shows exemplary forms of word contents in respective memories 1 through 6. Corresponding words are developed at the same time by the address counter 7. In particular, the English words and the Japanese words respectively developed from the memories 1 and 4, 2 and 5, and, 3 and 6 are paired. In the memories 4 through 6, characters "#1", "#2" etc. denote kinds of parts of speech.

An input key 8 represents a conventional alphabetical keyboard having 26 alphabetical letters or any other type of character keys. One or more alphabetical keys contained within the input key 8 are actuated to enter a specific English word. A register 9 is coupled to the input key 8 for temporarily containing the specific English word. A start key 10 is connected to the address counter 7 for operating the counter 7 with the object that pairs comprising an English word and a Japanese translated word are retrieved from the memories. A detection circuit 11 is provided for comparing and analyzing each letter or group of letters of the input word within the register 9 to determine whether the corresponding word has been stored within one of the memories 1, 2 and 3.

The address counter 7 is capable of addressing a number of address locations exceeding the maximum number of addresses occupied by the entry words in the entry word memories 1, 2 and 3. While the entry word memory 1 has the same number of addresses as the number of entry words, about 1,500, it is assumed that the address counter 7 can address a number of locations in excess of 1,500. In such a case, the entry word memory 1 may store and develop a particular type of output signal, say, "00 . . . 0" (all zero) as a terminating code indicating that all the addresses have been addressed already. This terminating code is detected by one of three detection circuits 12, 13 and 14.

Three flip flops 15, 16 and 17 are provided each comprising a set input terminal S and a reset terminal R. Each of the output terminals of the flip flop 15, 16 and 17 is coupled to each of terminals D of rank switches 18, 19 and 20. The rank switches 18, 19 and 20 are energized for the purpose of specifying a learning level of the operator. The rank switches 18, 19 and 20 may be connected to each other for joint operation. The terminal D is a terminal which is used while the electronic translator is operated as an electronic dictionary and language interpreter. The electronic dictionary and language interpreter is a device enabling that a specific word spelled in English be entered to obtain an equivalent word spelled in Japanese.

Each of other terminals I, II and III of the rank switches 18, 19, 20 is a terminal which is used while the electronic translator is operated as an electronic language learning aid. The electronic language learning aid mode enables that one or more native words, say, Japanese words are sequentially retrieved from one of the translated word memories and shown in the display, and foreign words corresponding to the native words, say, English words, are entered by the operator so as to compare their equivalency.

These terminals I, II and III are connected to a source supplying them voltage V. Additional switches 24 and 25 are provided together with the rank switches 18, 19, 20, all of the switches 18, 19, 20, 24 and 25 being related to each other in operation.

A register 21 is provided for containing the translated word retrieved from the translated word memories 4, 5 and 6. A random word key 22 is activated for generating a word at random. A random address circuit 23 is responsive to the random word key 22 or the switch 25 for providing a random address. The random address is introduced to the address counter 7 through the switch 24. The switch 24 is turned conductive while the rank switches 18, 19 and 20 are connected to one of the terminals I, II and III.

Six AND gates 26 through 31 are connected in such a manner that an input terminal of each of AND gates 26, 27 and 28 is coupled to an output terminal of the entry word memories 1, 2 and 3, respectively and another input terminal of the AND gates 26, 27 and 28 is coupled to each of the switches 18, 19 and 20, respectively.

When the switch 18 is connected to the terminal I, the AND gate 26 receives signals from voltage source V and one of the entry words developed from the entry word memory 1 is entered to the detection circuit 11 through an OR gate 32. When the switch 19 is connected to the terminal II, the AND gate 27 receives the voltage signals V and one of the entry words developed from the entry word memory 2 is introduced to the detection circuit 11 through the OR gate 32. Similarly, when the switch 20 is coupled to the terminal III, the AND gate 28 responds to the voltage signals such that one of the entry words generated from the entry word memory 3 is admitted to the detection circuit 11 through the OR gate 32.

An input terminal of each of the AND gates 29, 30 and 31 is coupled to an output terminal of the translated word memories 6, 5 and 4, respectively. The other input terminal of each of the AND gates 29, 30 and 31 is connected to the switches 20, 19 and 18. According to the selection by the switches 20, 19 and 18, one of the translated words developed from one of the translated word memories 6, 5 and 4 is admitted to the register 21 through an OR gate 33 and one of the AND gates 29, 30 and 31. The contents of the register 21 are displayed in a display 100. Otherwise, after the input key 8 is activated and before the start key 10 is activated, the contents of the register 9 are indicated in the display.

In operation, when the electronic translator is to function as the electronic dictionary and language interpreter, all the terminals D of the switches 18 through 20, and 25 are selected and the switch 24 is turned nonconductive. Under the circumstances, the input key 8 is activated so as to enter a specific English word, say, "ZOO", so that the register 9 contains code information equivalent to the word "ZOO". Then the start key 10 is energized so that the flip flops 16 and 17 are turned reset and the flip flop 15 is turned set. At the same time, the address counter 7 is operated to simultaneously address the memories 1 through 6 from the beginning or from a certain address.

In such a case, since only the flip flop 15 is turned set, only the AND gate 26 is made conductive. A first entry word developed from the entry word memory 1 by the address counter 7 passes the AND gate 26 and the OR gate 32 and reaches the detection circuit 11. For example, the first entry word is presumed to be "a".

The detection circuit 11 is responsive to the register 9 and the OR gate 32 for comparing the word "a" developed from the entry word memory 1 and the word "ZOO" entered by the input key 8. Since they are not equivalent in spelling, the detection circuit 11 generates output signals representing no equivalency which are entered to the address counter 7. The address counter 7 advances its contents by one so that its address becomes 2. Accordingly, the second addresses of the memories 1 through 6 are selected.

A second word stored in the entry word memory 1 is developed by the address counter 7. Now the second word is assumed to be "able". The second word is admitted to the detection circuit through the AND gate 26 and the OR gate 32.

The detection circuit 11 compares the second word "able" with the word "ZOO" entered. As they are not equivalent in spelling, the detection circuit 11 generates the output signals indicating no equivalece. The address of the address counter 7 further increases by one.

The above stated detection operations are repeated until there is found a specific entry word equivalent to the entered word "ZOO". As it is supposed that the entry word memory 1 contains no word equivalent to the entered word "ZOO"(See FIG. 2) no equivalency is obtained even when the last word, say, "youth" stored in address 1,500 in the memory 1 is outputted. The address of the address counter 7 further increases. As address 1,501 in the memory 1 has no word, the memory 1 generates final signals representing that all the words stored in the memory 1 have been outputted. The final signals are applied to the detection circuit 12. Responsive to the final signals, the detection circuit 12 causes the flip flop 15 to be turned reset. At the same time, the detection circuit 12 allows the flip flop 16 to be turned set, and the AND gate 26 and 27 to be made non-conductive and conductive, respectively.

Further output signals of the detection circuit 12 are admitted to a reset input terminal of the address counter 7 through an OR gate 40 and the switch 25.

The address counter 7 is reset so that the address of the counter 7 is brought to 1. Under the circumstances, the address counter 7 addresses the memories 1 through 6. Since the AND gate 27 is made conductive, the first entry word developed from the entry word memory 2 is introduced into the detection circuit 11 through the AND gate 27 and the OR gate 32. The detection circuit 11 compares the entered word "ZOO" with the first entry word. When they are not equivalent, the detection circuit 11 provides the output signals enabling that the address of the address counter 7 increases by one. This operation is repeated until an equivalent word is obtained by subsequently outputting a number of the entry words from the memory 2.

It is assumed that the entry word memory 2 has a word equivalent to the entered word "ZOO". When this word equivalent to the word "ZOO" is obtained, the detection circuit 11 determines their equivalency so that the address counter 7 is prevented from increasing its address.

Set output signals from the flip flop 16 are applied to the AND gate 30. The translated word memory 5 generates a translated word in Japanese equivalent to the entered word "ZOO" in response to the address counter 7 at the time the word "ZOO" is developed from the entry word memory 2. The translated word developed is entered to the register 21 through the AND gate 30 and the OR gate 33. The translated word stored in the register 21 is shown in the display.

If, despite the fact that a certain word is entered by the input key 8, no word equivalent to the word is stored in the entry word memories 1, 2 and 3, the entry word memory 3 provides signals representing that all the entry words have been outputted after all the entry word memories 1, 2 and 3 have been addressed by the address counter 7. The signals are developed due to the fact that the address counter 7 addresses a next address following the last address of the memory 3 having, say, 4,000 entry words.

The generation of the signals from the memory 3 is detected by the detection circuit 14. Detection circuit 14 may be made responsive to the signals for causing the display to show an error indication meaning that no word is present equivalent to the word entered.

In the event that the device does not comprise entry word memory 3 or the corresponding translated word memory 6, it may be preferable that the signals indicating that no equivalent word has been found may be provided by memory 2. The signals are applied to the detection circuit 14. When the address counter 7 has addressed all the addresses of the memories 1 and 2, and no word equivalent to the word entered is found, the address set in the address counter 7 increases by one in excess of the addresses for the memory 2 so that the signals are generated and applied to the detection circuit 14. The detection circuit 14 can cause the display to show the error indication.

Operation of the electronic translator as a language learning aid is as follows:

When it is desired that the words specified as the junior high school level be developed, the terminals I of the switches 18, 19, 20 and 25 are selected and at the same time the switch 24 is made conductive. The random word key 22 is energized so that the random address circuit 23 develops a random address. The random address developed is applied to the address counter 7.

In the case where the random address developed is 2, the address "2" is entered in the address counter 7, whereby each of the entry word memories 1 through 3 develops a specific entry word stored in the second address. As is seen from FIG. 2, for example, "able" is developed from the memory 1, "abate" is from the memory 2, and "aback" is from the memory 3. Each of the translated word memories 4, 5 and 6 generates its coresponding translated word.

As the AND gate 26 is connected to the switch 18, the specific entry word "able" developed from the entry word memory 1 passes through the AND gate 26 and the OR gate 32. The entry word is entered to the detection circuit 11. The input key 8 is operated to enter a word written in the foreign language which is considered by the operator to be equivalent to the translated word written in the native language, say, Japanese. The detection circuit 11 functions to determine whether the entry word from the memory 1 is equivalent to the entered word. If equivalent, the detection circuit 11 provides signals to the address counter 7 so that the address counter 7 increases its address by one and the address counter 7 addresses all the memories 1 through 6 according to a new address. A subsequent translated word will be retrieved from the memory 4 and shown in the display.

If no equivalency is obtained, the signals developed from the detection circuit 11 may be used to provide the error indication in the display. In such a case, the address counter 7 does not increase its address.

As the number of addresses in the memory 4 is the same as that of the memory 1, each of the entry words is related to a respective translated word developed from the memories 1 and 4, respectively. When all the entry words have been generated from the memory 1, the final signals are generated from the memory 1 and are detected by the detection circuit 12. Output signals from the detection circuit 12 reach the address counter 7 and the random address circuit 23 through the switch 25. Therefore, the address counter 7 and the random address circuit 23 are prevented from operating. Procedures for teaching the operator have been completed in connection with the junior high school level.

If it is desired that a further level or series of words be added, an additional memory such as a ROM may be inserted into the control circuit of FIG. 1.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A combined language interpreter and language learning aid device for selectively either inputting a word in a first language to obtain an equivalent word in a second language or for testing an operator's knowledge of said first and second languages, said device comprising:

mode selector means for selectively setting said device in a language interpretation mode or a learning aid mode;

first and second memory means for storing a plurality of words in the first and second languages, respectively, said first words being equivalent to respective second words;

input means for entering a first word in the first language;

access means responsive to said input means in said language interpretation mode for sequentially retrieving first words in said first language and second words equivalent to said first words from said first and second memory means;

detection means operatively connected to said input means and to said first memory means for detecting equivalency between said entered first word and each retrieved first word, and for providing a signal to said access means in said language interpretation mode for advancing said access means to retrieve another first word and second word when a retrieved first word is not equivalent to said entered first word;

indicating means operatively connected to said detection means and responsive to said detection means in the language interpretation mode for displaying a retrieved second word equivalent to a retrieved first word when said retrieved first word is equivalent to said input first word;

random address generating means for providing random addresses in the learning aid mode;

wherein said access means is operatively connected to said random address generating means and is responsive thereto in said learning aid mode for progressively randomly retrieving first words in said first language and second words equivalent to said first words;

wherein said indicating means is responsive to said access means in said learning aid mode for displaying progressively retrieved second words;

wherein said detection means comprises means for providing a signal for said random address generating means and said access means in said learning aid mode for advancing said access means to retrieve another first word and second word when said input first word is equivalent to a retrieved first word;

wherein said indicating means is responsive to said detecting means in said learning aid mode to repeatedly display a retrieved second word when said input first word is not equivalent to a retrieved first word.

2. The device as set forth in claim 1, wherein said first memory means comprises a first group of memories and said mode selector means further comprises means for selecting among said memories of the first group, wherein said access means is responsive to said mode selector means for retrieving first words from said selected first memory.

3. The device as set forth in claim 1, wherein said second memory means comprises a second group of memories and said mode selector means further comprises means for selecting among said memories of the second group, wherein said access means is responsive to said mode selector means for retrieving second words from said selected second memory.

4. The device as set forth in claim 2 or 3, wherein said mode selector means comprises a plurality of switches each having a first terminal for setting said device in said language interpretation mode and second terminals for setting said device in said learning aid mode, the number of said second terminals contained within each of said switches being equal to the number of memories in said first and second groups of memories.

5. The device as set forth in claim 1, wherein said first memory means comprises a first group of memories and said second memory means comprises a second group of memories, each of the memories of said first group storing a plurality of words in the first language corresponding to a plurality of words in the second language stored in a respective memory of the second group.

* * * * *